(12) United States Patent
Seran et al.

(10) Patent No.: US 12,190,547 B2
(45) Date of Patent: Jan. 7, 2025

(54) METHODS AND SYSTEMS FOR SCALABLE COMPRESSION OF POINT CLOUD DATA

(71) Applicant: Verizon Patent and Licensing Inc., Basking Ridge, NJ (US)

(72) Inventors: Vidhya Seran, Irving, TX (US); Syed B Aziz, North Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 460 days.

(21) Appl. No.: 17/537,948

(22) Filed: Nov. 30, 2021

(65) Prior Publication Data

US 2023/0169690 A1 Jun. 1, 2023

(51) Int. Cl.
| | |
|---|---|
| G06K 9/00 | (2022.01) |
| G06T 3/4084 | (2024.01) |
| G06T 7/168 | (2017.01) |
| G06T 7/60 | (2017.01) |
| G06T 7/73 | (2017.01) |
| G06T 9/00 | (2006.01) |

(52) U.S. Cl.
CPC ............ *G06T 9/00* (2013.01); *G06T 3/4084* (2013.01); *G06T 7/168* (2017.01); *G06T 7/60* (2013.01); *G06T 7/73* (2017.01); *G06T 2207/10028* (2013.01); *G06T 2207/20064* (2013.01)

(58) Field of Classification Search
CPC ........... G06T 2207/10028; G06T 2207/20064; H04N 19/63; H04N 1/3217; G06F 17/148
See application file for complete search history.

(56) References Cited

U.S. PATENT DOCUMENTS

| | | | | |
|---|---|---|---|---|
| 2015/0254857 | A1* | 9/2015 | Huang | G06T 7/33 382/154 |
| 2015/0371110 | A1* | 12/2015 | Hwang | G06T 17/005 382/201 |
| 2016/0300339 | A1* | 10/2016 | Jiang | H04N 13/106 |
| 2018/0075622 | A1* | 3/2018 | Tuffreau | G06T 9/40 |
| 2022/0108489 | A1* | 4/2022 | Sugio | G06T 9/00 |

FOREIGN PATENT DOCUMENTS

WO WO-2021194069 A1 * 9/2021

OTHER PUBLICATIONS

Hu, Wei, et al. "Graph signal processing for geometric data and beyond: Theory and applications." IEEE Transactions on Multimedia 24 (2021): 3961-3977. (Year: 2021).*

* cited by examiner

*Primary Examiner* — Andrew M Moyer
*Assistant Examiner* — Aidan Keup

(57) ABSTRACT

An illustrative point cloud compression system accesses an input point cloud dataset representative of a point cloud comprising a plurality of points. The point cloud compression system identifies a first attribute dataset and a second attribute dataset within the input point cloud dataset. Based on an application of a transform algorithm to the first and second attribute datasets, respectively, the point cloud compression system generates 1) a first low-frequency component and a first high-frequency component of the first attribute dataset, and 2) a second low-frequency component and a second high-frequency component of the second attribute dataset. The point cloud compression system then generates an output point cloud dataset that prioritizes both the first and second low-frequency components above both the first and second high-frequency components. Corresponding methods and systems are also disclosed.

20 Claims, 11 Drawing Sheets

Input Point Cloud Dataset 500    Attributes 502

| | X | Y | Z | C | ... |
|---|---|---|---|---|---|
| 404-1 | $X_1$ | $Y_1$ | $Z_1$ | $C_1$ | ... |
| 404-2 | $X_2$ | $Y_2$ | $Z_2$ | $C_2$ | ... |
| 404-3 | $X_3$ | $Y_3$ | $Z_3$ | $C_3$ | ... |
| 404-4 | $X_4$ | $Y_4$ | $Z_4$ | $C_4$ | ... |
| 404-5 | $X_5$ | $Y_5$ | $Z_5$ | $C_5$ | ... |
| 404-6 | $X_6$ | $Y_6$ | $Z_6$ | $C_6$ | ... |
| 404-7 | $X_7$ | $Y_7$ | $Z_7$ | $C_7$ | ... |
| 404-8 | $X_8$ | $Y_8$ | $Z_8$ | $C_8$ | ... |
| 404-9 | $X_9$ | $Y_9$ | $Z_9$ | $C_9$ | ... |
| 404-10 | $X_{10}$ | $Y_{10}$ | $Z_{10}$ | $C_{10}$ | ... |
| 404-11 | $X_{11}$ | $Y_{11}$ | $Z_{11}$ | $C_{11}$ | ... |
| 404-12 | $X_{12}$ | $Y_{12}$ | $Z_{12}$ | $C_{12}$ | ... |
| 404-13 | $X_{13}$ | $Y_{13}$ | $Z_{13}$ | $C_{13}$ | ... |
| 404-14 | $X_{14}$ | $Y_{14}$ | $Z_{14}$ | $C_{14}$ | ... |
| 404-15 | $X_{15}$ | $Y_{15}$ | $Z_{15}$ | $C_{15}$ | ... |
| 404-M | ... | ... | ... | ... | ... |

METHODS AND SYSTEMS FOR SCALABLE COMPRESSION OF POINT CLOUD DATA

BACKGROUND INFORMATION

Various ways of representing graphical, geometric, and other properties of objects are employed in various applications and use cases. For example, entertainment, education, communication, and other applications make use of two-dimensional (2D) or three-dimensional (3D) representations of objects and scenes such as 2D images from particular perspectives, 3D volumetric models, and so forth. Extended reality (XR) technologies such as virtual reality (VR) and augmented reality (AR) technologies are examples where such data representations may be useful.

Collections of data for a plurality of points in a point cloud associated with an object (e.g., including data representative of spatial coordinates of each of the points) may be referred to as point cloud data, and may serve as an example of an important type of data representation that can be used for various applications such as those described above. A collection of point cloud data (a "point cloud dataset") may be used, for example, to represent a point cloud for a given object or scene at a moment in time or over a time period. Such a point cloud dataset may be useful to facilitate the generation of different types of XR content, 2D or 3D video content (e.g., for movies or video games), live streaming content (e.g., for real-time communication applications), and/or other content in which the object or scene is represented. Point cloud datasets may also be utilized in automation applications (e.g., autonomous vehicles, robotics, etc.) and for various other use cases.

One challenge of utilizing point cloud data in any of these applications, however, is the large amount of data needed to represent a point cloud. For instance, given that certain 3D objects and scenes may be represented by point clouds containing thousands or millions of points and may be updated many times per second (e.g., based on a frame rate such as 30 frames per second), point cloud data may be extremely voluminous and may be difficult and burdensome to store, transmit, analyze, and/or otherwise make use of in a raw, uncompressed form.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

FIG. 5 shows an illustrative input point cloud dataset representing a point cloud such as the point cloud of FIG. 4B in accordance with principles described herein.

FIG. 8A shows illustrative multi-level representations of each of the attribute datasets identified from the point cloud dataset of FIG. 5 in accordance with principles described herein, FIG. 8B shows an illustrative output point cloud dataset generated based on the multi-level attribute datasets of FIG. 8A in accordance with principles described herein.

DETAILED DESCRIPTION OF EXAMPLE EMBODIMENTS

Figure 1:
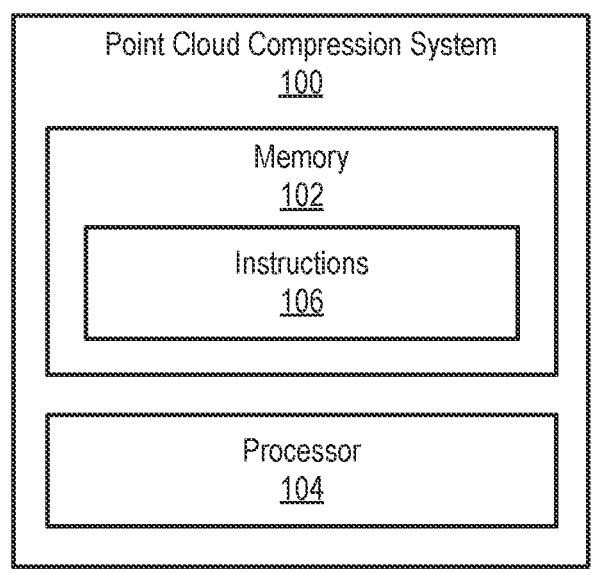
FIG. 1 shows an illustrative point cloud compression system configured to perform scalable compression of point cloud data in accordance with principles described herein.

Methods and systems for scalable compression of point cloud data are described herein. As mentioned above, while various applications may benefit in various ways from using point cloud data to represent objects and/or scenes, raw point cloud data (e.g., point cloud data in the form in which it is initially captured or created before any compression or processing has been performed to simplify the data) tends to be relatively unwieldy and difficult to work with (e.g., store, transmit, present, analyze, apply, use, etc.) due to the sheer amount of data that is needed to represent a point cloud at a desired resolution and frame rate. For example, several gigabytes per second worth of data may be needed to represent a point cloud having 1 million points refreshed at 30 frames per second (fps). Keeping up with this volume of data in real time or for more than a few seconds or minutes may be taxing on many computing systems, and may be beyond the capability of certain user equipment such as mobile devices commonly used to present object and scene representations to users. Accordingly, methods and systems described herein relate to ways that large amounts of point cloud data may be scalably compressed to facilitate any of the various types of operations (e.g., storing, transmitting, presenting, analyzing; etc.) that may be performed using the point cloud data.

In some examples, methods and systems for compressing point cloud data may involve abbreviating or summarizing the point cloud data in a manner that outputs less point cloud data than was input and that, like various established data compression schemes, may be either lossy or lossless in regard to the information that can be reconstructed from the output data. In other examples, methods and system for compressing point cloud data may not necessarily decrease the overall amount of data that is available for use, but rather may rearrange, prioritize, reorganize, and/or otherwise reformat the point cloud data so as to facilitate making use of a relatively small amount of important point cloud data (e.g., data that represents a basic form or structure of an object or scene), while not necessarily making use of other, less important point cloud data (e.g., data that fills in the basic form or structure with more nuanced details). In both cases, point cloud compression may compress the information associated with an input point cloud dataset (e.g.; a set of data representative of an uncompressed or partially compressed point cloud) along various dimensions or aspects. For instance, compression techniques described herein may relate to geometric details (e.g.; geometric resolution or number of points represented, etc.), quality details (e.g., color resolution or number of colors that can be represented, etc.); temporal details (e.g., frame rate or how often point clouds are updated, etc.), or other compressible information as may serve a particular implementation.

As will be illustrated and described in more detail below, compression methods and systems described herein may allow compressed point cloud datasets (also referred to as output point cloud datasets) to be scalable in the amount of detail they provide so as to allow a single output point cloud dataset to serve the needs of a plurality of different systems and/or use cases (some of which may benefit from more details than others). For example, a different portion of a same output point cloud dataset may be provided to one device (e.g., a mobile device with relatively modest computing resources, a relatively small or low-resolution screen, etc.) than is provided to another device (e.g., a large television with more substantial computing resources, a relatively large and high-resolution screen, etc.) based on the respective needs and capabilities of the two devices, based on network conditions present at a time that the data is to be communicated, based on the applications to which the point cloud data will be put to use, or based on various other factors.

Along with providing scalability of quality, resolution, frame rate, and other such properties that point clouds may possess, methods and systems described herein facilitate segmentation and prioritization of different objects in a scene being represented. For example, certain data processed as part of point cloud datasets described herein may represent segmentation masks (e.g., indicating which points correspond to which objects in a scene), priority masks (e.g., indicating objects are considered to be of higher importance or lower importance for the scene as a whole), and/or other such information to help group point cloud coefficients for scalable streams, to help remove outlier points and/or noise from the point clouds, and so forth.

Along with novel and substantial scalability benefits that have been described, methods and systems described herein for scalable compression of point cloud data may also provide other benefits and advantages. For example, as will be described in illustrated in more detail below, these methods and systems may rely on a sub-band packaging approach, rather than an octree-based technique or other such conventional packaging approach, for the output point cloud datasets. The sub-band packaging approach supports the scalability benefits described above for an arbitrary number of attributes described by each point. For instance, along with positional attributes for each point (e.g., X, Y, and Z coordinates of the points' positions, etc.), other non-positional attributes of each point such as color attributes, normal attributes, texture attributes, and so forth, may also be included in the output point cloud dataset using this sub-band-based approach. Moreover, as will also be described, temporal aspects of point cloud data (e.g., how a given point cloud is updated from frame to frame) may also or alternatively be compressed using methods and systems described herein by treating interleaved sets of frames of a temporally varying point cloud (e.g., a set including the first, fourth; seventh, and tenth frames, etc.; a set including the second, fifth, eighth, and eleventh frames, etc.; and a set including the third, sixth, ninth, and twelfth frames, etc.) as distinct attributes of the point cloud (e.g., a four-dimensional (4D) point cloud with three spatial dimensions and one time dimension).

Another benefit provided by certain implementations is that well established transform algorithms (e.g., wavelet transform algorithms, etc.) that are well supported in hardware and software of currently-deployed systems may be relied on to generate, encode, decode, and ultimately use compressed point cloud data, rather than needing to rely on custom decoders or techniques as certain point cloud compression schemes have suggested. By utilizing optimized wavelet filters that are already deployed in common end-user devices (e.g., mobile devices, personal computers, televisions, etc.), decoding capabilities for progressive point cloud datasets provided at a suitable level of detail may be made available even to low-end computing devices that have previously not been capable of receiving and using such point cloud data due to being overwhelmed by the data's scale.

Various specific implementations will now be described in detail with reference to the figures. It will be understood that the specific implementations described below are provided as non-limiting examples and may be applied in various situations, Additionally, it will be understood that other examples not explicitly described herein may also be captured by the scope of the claims set forth below. Methods and systems described herein for scalable compression of point cloud data may provide any of the benefits mentioned above, as well as various additional and/or alternative benefits that will be described and/or made apparent below.

FIG. 1 shows an illustrative point cloud compression system 100 ("system 100") configured to perform scalable compression of point cloud data in accordance with principles described herein. System 100 may be implemented by computer resources such as processors, memory facilities, storage facilities, communication interfaces, and so forth. For instance, system 100 may be partially or fully implemented by server-side, multi-access computing systems separate from user equipment (UE) devices that present content to users. In various implementations, at least part of system 100 may be implemented by distributed computing systems operated by a cellular data provider (e.g., multi-access edge compute (MEC) systems), by distributed computing systems operated by a cloud-computing provider (e.g., multi-access cloud compute systems), by computing devices used by end users (e.g., UE devices, head-mounted or hand-held extended reality (SCR) presentation devices, mobile devices such as smartphones or tablet devices, personal computers, smart televisions, or other equipment used directly by end users), or by any other suitable computing systems as may serve a particular implementation.

As shown, system 100 may include, without limitation, a memory 102 and a processor 104 selectively and communicatively coupled to one another, Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with performing scalable compression of point cloud data in accordance with methods and systems described herein and/or as may serve a particular implementation.

Figure 2:
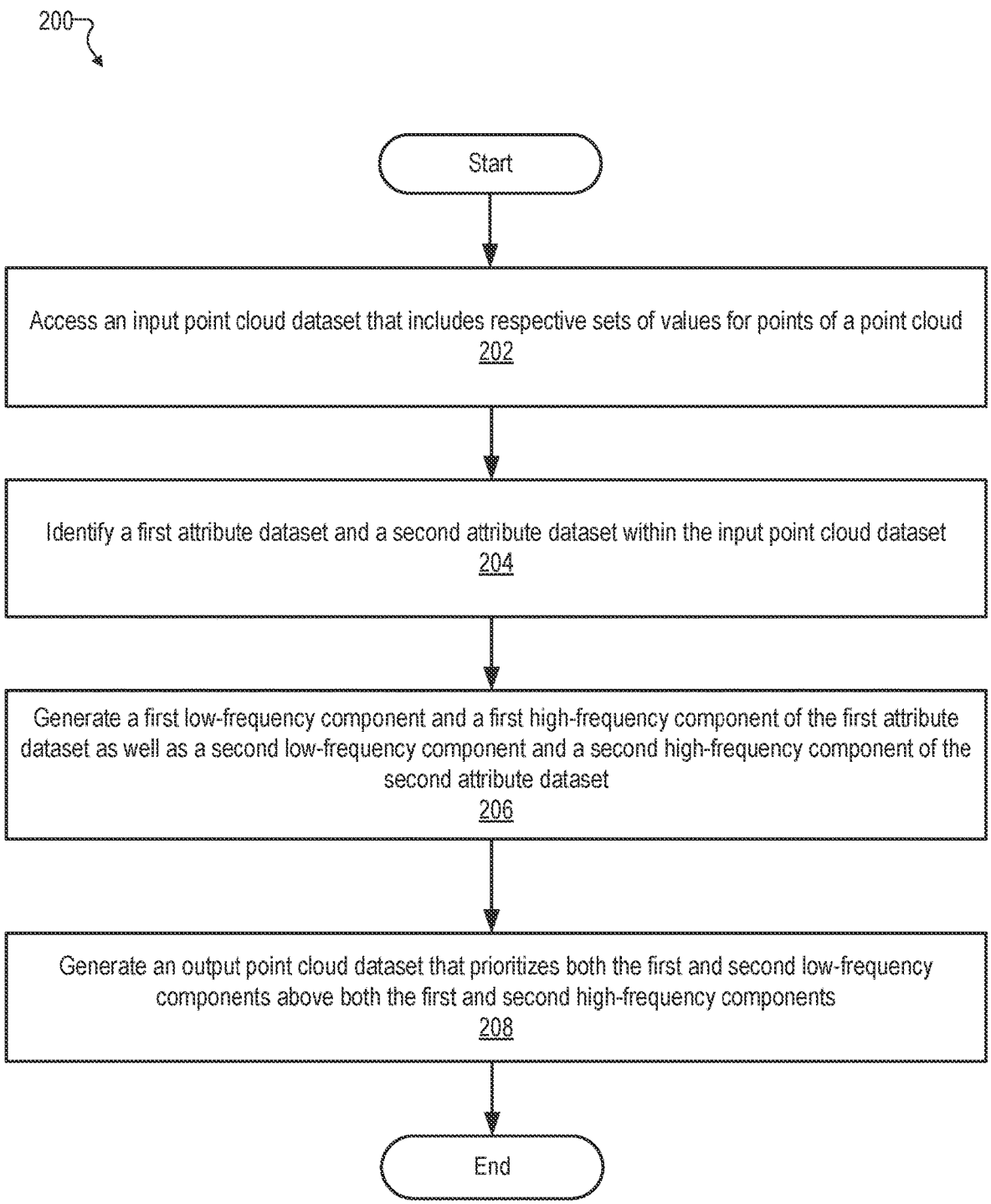
FIG. 2 shows an illustrative method for scalable compression of point cloud data in accordance with principles described herein.

To illustrate certain functionality that processor 104 may perform, FIG. 2 shows an illustrative method 200 for scalable compression of point cloud data in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described, One or more of the operations shown in FIG. 2 may be performed by a point cloud compression system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by an implementation of system 100 (e.g., by processor 104 executing instructions 106 stored in memory 102).

At operation 202, system 100 may access an input point cloud dataset representative of a point cloud. The point cloud may comprise a plurality of points that are defined within the input point cloud dataset. For instance, as will be described and illustrated in more detail below, the plurality of points comprised in the point cloud may be associated with surface points of one or more objects (e.g., 2D or 3D objects) captured or created (e.g., simulated, etc.) for a particular moment in time. In examples in which the point cloud represents an object that is changing or moving in time, the input point cloud dataset may represent the one or more objects during a time range (e.g., for a past period of time, in progressive real time as an object is being captured, etc.) by incorporating a sequence of frames that represent snapshots of the object at different respective times of a sequence of times included in the time range (e.g., a sequence of times $\frac{1}{30}^{th}$ of a second apart for a frame sequence of 30 fps, etc.).

The input point cloud dataset accessed at operation 202 may include a respective set of values for each of the plurality of points (including, for examples involving sequences of frames, points from each frame in the frame sequence). That is, a first point in the plurality of points may be represented within the input point cloud dataset as a first set of values, a second point in the plurality of points may be represented within the input point cloud dataset as a second set of values (distinct from the first set of values), and so forth for each point in the plurality of points. As will be described and illustrated in more detail below, different values within each of these sets of values may correspond to different attributes of a set of attributes (including at least a first attribute and a second attribute and, in certain examples, additional attributes). For instance, a set of attributes for one illustrative input point cloud dataset may include three positional attributes: an X coordinate, a Y coordinate, and a Z coordinate. As such, for this example, the first point mentioned above would have a first X coordinate, a first Y coordinate, and a first Z coordinate; the second point mentioned above would have a second X coordinate, a second Y coordinate, and a second Z coordinate; and so forth for each point in the plurality of points.

At operation 204, system 100 may identify various attribute datasets within the input point cloud dataset. For example, the identified attribute datasets may include an attribute dataset for each attribute in the set of attribute (e.g., a first attribute dataset for a first attribute, a second attribute dataset for a second attribute, and, in certain examples, one or more additional attribute datasets for additional attributes that may be included in the set of attributes). Each attribute dataset identified at operation 204 may include some or all of the respective values, from each of the respective sets of values described above in relation to operation 202, that correspond to the attribute with which the attribute dataset is associated. For example, if a first attribute dataset identified at operation 204 is associated with a positional attribute for the X coordinates of the plurality of points of the point cloud, the first attribute dataset may include some or all of the values corresponding to the X coordinate attribute from each of the respective sets of values represented for the plurality of points. Similarly, if a second attribute dataset identified at operation 204 is associated with a positional attribute for the Y coordinates of the plurality of points of the point cloud, the second attribute dataset may include some or all of the values corresponding to the Y coordinate attribute from each of the respective sets of values represented for the plurality of points. Other attribute datasets identified at operation 204 may similarly include values, from each of the respective sets of values, that correspond to other attributes that may be included in the set of attributes for a given input point cloud dataset (e.g., a positional attribute for the Z coordinates; a non-positional attribute for a color, a normal, or another such non-position-related characteristic; etc.).

At operation 206, system 100 may generate a first low-frequency component and a first high-frequency component of the first attribute dataset. For example, these components may be derived based on an application of a transform algorithm such as a wavelet algorithm or another suitable algorithm to the first attribute dataset to distinguish low-frequency information for the first attribute dataset (e.g., corresponding to more fundamental or important details of the first attribute dataset) from high-frequency information for the first attribute dataset (e.g., corresponding to more ancillary or nuanced details of the first attribute dataset). Similarly, and also at operation 206, system 100 may generate a second low-frequency component and a second high-frequency component of the second attribute dataset. In like manner as the first components described above, these components may be derived based on an application of the transform algorithm to the second attribute dataset to similarly distinguish low-frequency information for the second attribute dataset from high-frequency information for the second attribute dataset. While, for the sake of clarity, only first and second instances of various elements (e.g., attribute datasets, low- and high-frequency components, etc.) are laid out explicitly in this example, it will be understood that additional elements for any number of additional attributes as are present in a particular implementation may be processed in the same way as described for the first and second instances of these elements.

At operation 208, system 100 may generate an output point cloud dataset based on attribute datasets filtered into the components generated at operation 206. More particularly, the output point cloud dataset generated at operation 208 may be arranged (e.g., structured, organized, formatted, packed or packaged, etc.) so as to prioritize both the first and second low-frequency components above both the first and second high-frequency components. For example, if the output point cloud dataset is structured as a data file configured to be stored or transmitted, the data file may set forth all of the low-frequency components (e.g., including the first and second low-frequency components in this example) prior to setting forth any of the high-frequency components (e.g., including the first and second high-frequency components in this example). In this way, as has been mentioned and as will be described and illustrated in more detail below, the data file may be scalable to accommodate different capabilities and/or needs that different recipients of the data file may have. For instance, by providing only the first portion of the data file (e.g., the portion that includes the low-frequency components), system 100 may cater to a device with fewer resources, while, by providing both the first portion and a second portion of the data file (e.g., the portion that includes the high-frequency components), system 100 may cater to a device with greater resources.

Similar principles may apply to other types of datasets structured in different ways than data files (e.g., data streams, data structures stored and accessed in transitory memory, etc.). Additionally, as will be further described and illustrated below, multi-level applications of the transform algorithm may provide for an arbitrary degree of scalability to serve many more than the two illustrative types of devices and device resource quantities described for this example.

As will be described in more detail below, various other operations beyond operations 202-208 may be performed by system 100 as part of a scalable point cloud data compression method such as method 200. As one example, upon generating the output point cloud dataset at operation 208, system 100 may provide the output point cloud dataset to a point cloud processing system configured to store, transmit, analyze, or otherwise use the output point cloud dataset. In this way, any of the applications or use cases described herein to make use of point cloud data may be enabled and facilitated by way of a scalably compressed output point cloud dataset that is configured to provide the various benefits and advantages described herein.

Figure 3:
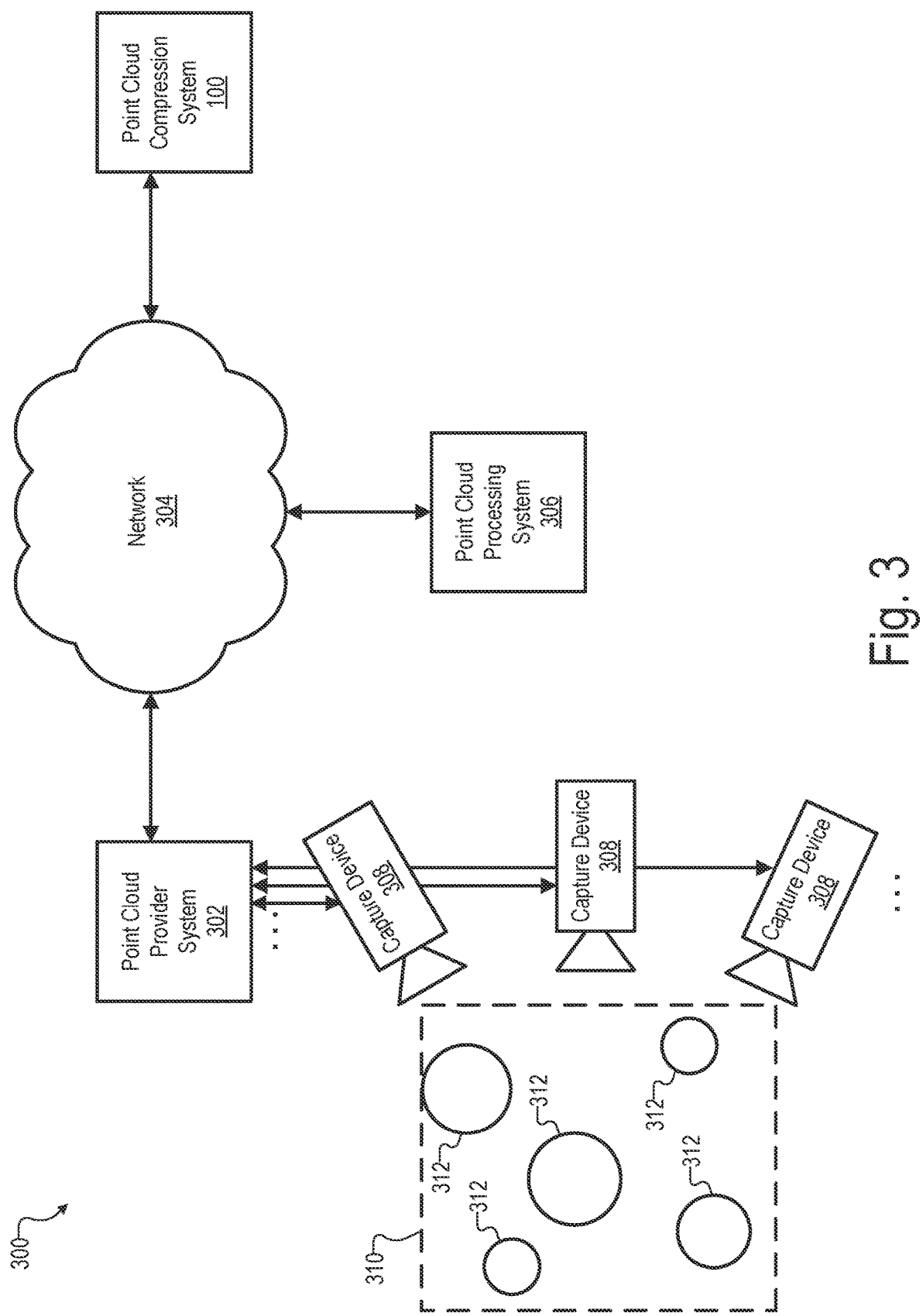
FIG. 3 shows an illustrative configuration in which the point cloud compression system of FIG. 1 may operate in accordance with principles described herein.

FIG. 3 shows an illustrative configuration 300 in which system 100 may operate in accordance with principles described herein. Specifically, as illustrated, system 100 may operate in connection with a point cloud provider system communicatively coupled to system 100 by way of a network 304, as well as a point cloud processing system 306 that, as shown in the example of configuration 300, may similarly be connected to system 100 by way of network 304. While network 304 is shown in configuration 300 to be providing a communicative fabric by way of which the systems 100, 302, and 306 intercommunicate and interoperate with one another, it will be understood that, in other configurations, system 100 may be integrated with either or both of systems 302 and 306, or the computing systems may be communicatively coupled directly or by other communicative means not necessarily involving a network such as network 304. A detailed description of system 100 having been provided in connection with FIGS. 1 and 2, a more detailed description of point cloud provider system 302 and point cloud processing system 306 will now be provided.

Point cloud provider system 302 may be any computing system configured to capture, generate, simulate, obtain, or otherwise gain access to an input point cloud dataset and to provide the input point cloud dataset to system 100 (e.g., by way of network 304, as shown in configuration 300). While certain examples of point cloud provider systems may access input point cloud datasets by calling them up from storage or generating them (e.g., by simulating them or the like), the illustrative point cloud provider system 302 in configuration 300 is shown to gain access to point cloud datasets by accessing data from capture devices it controls and then generating the point cloud datasets itself.

To illustrate, bidirectional arrows are shown to connect point cloud provider system 302 to a plurality of capture devices 308 (while three capture devices 308 are shown, the ellipses are shown to indicate that more than three such devices may be included in the plurality), Point cloud provider system 302 may receive image data (e.g., color images, depth images, etc.) from this plurality of capture devices 308 as the capture devices are arranged with respect to (e.g., at various positions within, around, surrounding, etc.) a scene 310 that includes one or more objects 312.

The image data received and processed by point cloud provider system 302 may include depth datasets that are captured by capture devices 308 and that represent geometric properties of various surfaces of objects 312 as detected from the different viewpoints at which capture devices 308 are positioned. For example, certain of capture devices 308 may capture depth datasets representing the front of a particular object 312, other capture devices 308 may capture depth datasets representing the back of the particular object 312, other capture devices 308 may capture depth datasets representing the sides of the particular object 312, and so forth. While not explicitly shown in configuration 300, it will be understood that capture devices 308 may, in some configurations, be positioned on all sides of scene 310 so as to capture objects 312 within the scene from viewpoints 360° around the objects.

Capture devices 308 may capture depth data and other data representative of objects 312 within scene 310 in any suitable way, and this depth data may be the basis for positional attributes of the points of a point cloud dataset generated by point cloud provider system 302. As one illustrative depth data capture technique, capture devices 308 may utilize a time-of-flight depth capture technique to scan objects within scene 310 to thereby generate the depth data representative of objects 312. As another example technique, each capture device 308 may be implemented as a pair of color data capture devices (e.g., video cameras, etc.) that captures stereo images that can be used to derive the depth data. For instance, if extrinsic parameters for each of two stereo capture devices at a single node (e.g., represented by a single capture device 308 illustrated in configuration 300) are known, depth information for various features depicted in imagery captured by the stereo capture devices may be derived based on how these features are depicted in each of the stereo images and based on the known extrinsic parameters. Similar techniques may also make use of structured light (e.g., infrared light patterns, etc.) or other suitable depth capture technologies. Along with depth data representative of the positions and surface geometries of objects 312 within scene 310 from each viewpoint, capture devices 308 may also provide, to point cloud provider system 302, intensity data (e.g., color data, grayscale data, etc.) that represents how the objects appear from those same viewpoints.

For clarity of description and illustration, scene 310 is shown in configuration 300 to encompass a rectangular area that includes a variety of objects 312 illustrated as circles of different sizes. It will be understood, however, that scene 310 may be any suitable size or shape and may be located indoors, outdoors, or in any other location. It will also be understood that objects 312 may each represent a person or other living thing, an inanimate object, a surface (e.g., the ground, a wall, a surface of a body of water, etc.), or any other suitable object as may be included within scene 310. As one example, scene 310 could include a field on which a sporting event is taking place (e.g., a football field where a football game is taking place, a basketball court on which a basketball game is taking place, etc.) and objects 312 could include players, referees, the ball, and so forth.

Point cloud provider system 302 may direct capture devices 308 to synchronously capture a sequence of images (with corresponding depth and/or color datasets) of objects 312 within scene 310 such that point cloud provider system 302 may receive respective frame sequences of color and depth frames from each of the viewpoints at which capture devices 308 are positioned. Point cloud provider system 302 may then process these frame sequences (and/or other data received from capture devices 308) to generate an input point cloud dataset and provide the dataset to other systems or devices (e.g., to system 100).

Network 304 may be implemented by any suitable private or public networks as may serve a particular implementation. For instance, part of network 304 may be implemented by a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). The provider of such a provider network may own or control all of the elements necessary to sell and deliver communications services between point cloud provider system 302, system 100, one or more point cloud processing systems 306 (only one of which is explicitly shown in configuration 300), and/or other computing devices connected to the network. Such communications services may include radio spectrum allocation, wireless network infrastructure, back haul infrastructure, provisioning of devices, network repair, and so forth.

In some examples, other networks not controlled by the provider may also be included within network 304. For example, external network infrastructure may include the Internet, one or more wide area networks or local area networks to which the illustrated computing systems are connected, a content delivery network, and/or any other suitable network or networks managed by any third parties outside of the control of the provider of the provider system described above. The network elements associated with network 304 may implement or employ any suitable communication technologies, devices, media, protocols, or the like as may serve a particular implementation. In certain examples, one or more of point cloud provider system 302, system 100, and point cloud processing system 306 may be implemented by MEC systems incorporated into a provider network, by multi-access cloud compute systems, and/or by other distributed computing resources as may be incorporated into or communicatively coupled with network 304 in a particular implementation.

Point cloud processing system 306 represents an example of a computing system or device to which system 100 will provide an output point cloud dataset for some type of use. For example, upon receiving an output point cloud dataset from system 100, point cloud processing system 306 may store the output point cloud dataset, render the output point cloud dataset, decode or rearrange the output point cloud dataset, graphically present the output point cloud dataset to a user, perform analysis or processing on the output point cloud dataset to generate media content (e.g., SCR content, graphical content, etc.), perform an action (e.g., control a robotic or automated process) based on the output point cloud dataset, or otherwise use the output point cloud dataset in any manner as may serve a particular implementation.

To this end, in certain implementations, point cloud processing system 306 may be implemented by a computing device used by a user to view graphics such as a 3D model of one or more of objects 312 rendered based on output point cloud datasets received from system 100. For example, based on such output point cloud datasets, point cloud processing system 306 may generate representations (e.g., 3D voxelized representations, 3D textured meshes, etc.) of one or more objects 312 to allow point cloud processing system 306 to render these representations into an image that can be presented to the user from an arbitrary viewpoint selected by the user.

Point cloud processing system 306 may be implemented by various types of computing devices that are capable of storing point cloud data, displaying graphical imagery to users, directing automated processes, and/or otherwise making use of point cloud data. For instance, point cloud processing system 306 could be implemented as (or included within) an industrial server system such as a MEC system included on a provider network, a cloud compute system, or the like. As another example, point cloud processing system 306 could be implemented as (or included within) a consumer computing system such as a mobile device (e.g., a smartphone, a tablet computing device, etc.), a dedicated XR presentation device (e.g., a head-mounted VR or AR device configured to display graphics directly in front of each eye of the user), a portable or stationary computing device (e.g., a personal desktop or laptop computer, etc.), a television device, or any other system or device as may serve a particular implementation. In some examples, point cloud processing system 306 may include one or more display screens (e.g., traditional display screens, partially transparent heads-up display (HUD) screens, computer monitors, etc.) configured to display frames rendered by point cloud processing system 306 itself or by other systems such as point cloud provider system 302 or system 100.

Figure 4B:
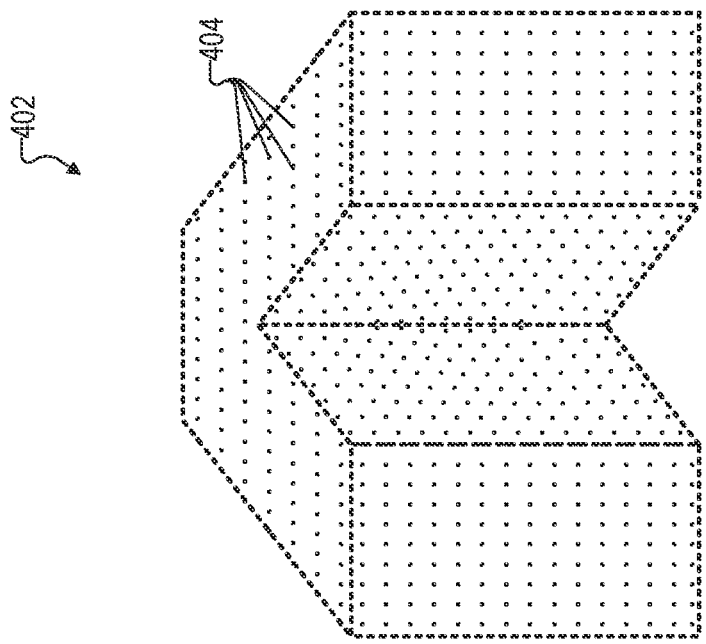
FIG. 4B shows an illustrative point cloud associated with the 3D object of FIG. 4A in accordance with principles described herein.
Figure 4A:
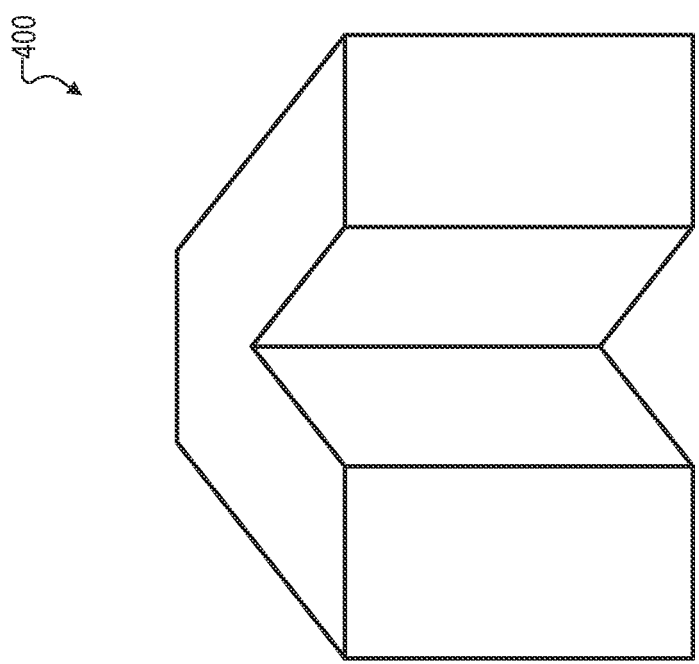
FIG. 4A shows an illustrative three-dimensional (3D) object that may be represented by point cloud data in accordance with principles described herein.

FIG. 4A shows an illustrative three-dimensional (3D) object 400 that may be represented by point cloud data in accordance with principles described herein. 3D object 400 may represent an example of one of objects 312, described above. While 3D object 400 is illustrated as a 3D object (e.g., a real world object that may be captured as described above for objects 312, a virtual object that may be simulated on a computer, etc.), it will be understood that analogous 2D objects and 4D objects (i.e., 3D objects that move and change in time) may be also be represented by point cloud data that may be scalably compressed using the same or similar principles described herein for 3D objects such as 3D object 400. Additionally, while 3D object 400 is drawn as a relatively simple geometric shape for clarity of illustration, it will be understood that 3D object 400 may be any suitable object having surfaces with various textures of arbitrary complexity. For example, as mentioned above for objects 312, 3D object 400 may represent an object such as a person or other living thing, an inanimate object (e.g., a building, a piece of furniture, a vehicle, etc.), a ground or wall surface, a surface of a non-solid body (e.g., a body of water, a cloud, etc.), or any other suitable 3D object as may serve a particular implementation, FIG. 4B shows an illustrative point cloud 402 associated with 3D object 400 of FIG. 4A. As shown, point cloud 402 is similar in appearance to 3D object 400, but, in place of the solid surfaces possessed by 3D object 400, point cloud 402 includes a plurality of points 404 (only a few of which are explicitly labeled, but a large number of which are illustrated) representing various surface samples that have been captured or simulated along the surfaces of 3D object 400. The sampling resolution of these points 404 (corresponding to the number of points used to represent 3D object 400 and/or each surface thereof) may be any resolution supported by a given capture device 308 and/or point cloud provider system 302 to suitably represent the details of the 3D object (e.g., based on the size of the object, the intricacy of the object's textures and features, etc.). By generating point cloud 402 based on 3D object 400, 3D object 400 may be represented digitally by point cloud data so as to allow for various applications and use cases described herein.

FIG. 5 shows an illustrative input point cloud dataset 500 that represents a point cloud such as point cloud 402 of FIG. 4B. As shown on horizontal rows within the dataset, each of the plurality of points 404 (e.g., points 404-1 through 404-M, where M is the total number of points) is represented in input point cloud dataset 500 with a respective set of values. As has been described, each of these sets of values represented for points 404 includes values corresponding to each attribute in a set of attributes 502 that includes at least a first attribute and a second attribute. In this particular example, the point cloud being represented is a composite 3D point cloud representing not only positional information (X, Y, and Z coordinates, etc.) but also being composited with other non-positional information (color information in this example). As such, each of the plurality of points 404 is illustrated as a composite 3D point defined with respect to a 3D coordinate system having an x-axis, a y-axis, and a z-axis and with respect to a composite attribute indicative of a non-positional feature (a color attribute) of the composite 3D point.

As shown, the set of attributes for this example includes three positional attributes 502 corresponding to the 3D coordinate system and at least one composite attribute 502 corresponding to a non-positional feature. More particularly, in this example, a first attribute 502 corresponds to the x-axis (as indicated by a column header "X"), a second attribute 502 corresponds to the y-axis (as indicated by a column header "Y"), a third attribute 502 corresponds to the z-axis (as indicated by a column header "Z"), and a fourth attribute 502 corresponds to the non-positional feature (color, in this example, as indicated by the column header "C"). Moreover, it will be understood that, potentially, one or more additional composite attributes 502 corresponding to additional positional or non-positional features (as indicated by a column header " . . . ") may also be included. For example, one or more attributes represented by the ellipsis in FIG. 5 may indicate a normal for each point, surface information for each point, or any other suitable information that is captured and/or tracked for each point in a particular implementation.

Each point 404 is shown to have a value corresponding to each of the attributes 502 in the set of attributes. For example, the respective set of values for point 404-1 is shown to include a value "$X_1$" corresponding to the first attribute (the x-axis), a value "$Y_1$" corresponding to the second attribute (the y-axis), a value "$Z_1$" corresponding to the third attribute (the z-axis), and a value "$C_1$" corresponding to the fourth attribute (the color). While the values shown in FIG. 5 are represented using the column headers and subscripts matching the index of each point 404 (e.g., "$X_1$" to represent the x-axis attribute for point 404-1, "$Y_2$" to represent the y-axis attribute for point 404-2, etc.), it will be understood that the values in input point cloud dataset 500 may represent any suitable type or amount of data. For instance, each of the positional values (e.g.; $X_1$, $Y_1$, $Z_1$, $X_2$, $Y_2$, $Z_2$, etc.) may be represented by a 32-bit floating point value representing a precise position on the respective axis. Similarly; each of the non-positional values (e.g., $C_1$, $C_2$, certain values represented by the ellipsis, etc.) may be represented by a 32-bit composite value representing the feature in a suitable way (e.g., 8-bits each to represent a red component, a green component, a blue component, and an alpha component for color data in an RGB format, etc.).

While, as mentioned above, input point cloud dataset 500 represents a composite 3D point cloud (i.e., a 3D point cloud that combines positional attributes with one or more other attributes for each point, such as a color attribute in the example of FIG. 5), it will be understood that the same or similar principles may be applied to other types of input point cloud datasets.

As one example, a point cloud being represented may be a 2D point cloud. In this example, each of the plurality of points may be a 2D point defined with respect to a 2D coordinate system having an x-axis and a y-axis. The set of attributes for this example may include two positional attributes corresponding to the 2D coordinate system. More particularly, a first attribute may correspond to the x-axis, while a second attribute may correspond to the y-axis. Similarly, in the case of a composite 2D point cloud, one or more additional attributes could also be included to represent non-positional features such as color, normal, or the like.

As another example, a point cloud being represented may be a 3D point cloud that does not include a composite of positional and other attributes. In this example, each of the plurality of points may be a 3D point defined with respect to a 3D coordinate system having an x-axis, a y-axis, and a z-axis. The set of attributes for this example may include three positional attributes corresponding to the 3D coordinate system, but, unlike the example of input point cloud dataset input point cloud dataset 500, may not include additional non-positional attributes. For the 3D point cloud, a first attribute may correspond to the x-axis, a second attribute may correspond to the y-axis, and a third attribute may correspond to the z-axis. In any of the examples that have been described, it will be understood that a temporal dimension may also be added to allow 2D or 3D point clouds animated in a frame sequence to be compressed using principles described herein. Certain examples of how the temporal dimension may be accounted for will be described in more detail below.

Each set of values for each point 404 is shown on a different horizontal row in input point cloud dataset 500, while the values from each of the respective sets of values that correspond to each individual attribute are aligned in columns with column headers indicating what each individual attribute is (e.g., "X", "Y", etc.), These collections of values for each individual attribute are referred to as attribute datasets and, as illustrated by dashed-line boxes outlining each column, are labeled as attribute datasets 504 in FIG. 5, More particularly, an attribute dataset 504-X refers to an attribute dataset including all the x-axis coordinate values of points 404, an attribute dataset 504-Y refers to an attribute dataset including all the y-axis coordinate values of points 404, an attribute dataset 504-Z refers to an attribute dataset including all the z-axis coordinate values of points 404, and an attribute dataset 504-C refers to an attribute dataset including all the color values of points 404. As indicated by a dashed-line box labeled as attribute dataset 504-N, one or more additional attribute datasets (corresponding to attributes represented by the ellipses in FIG. 5) may also be included in input point cloud dataset 500 and may be handled in accordance with the same principles described herein for the X, Y, Z, and C attributes 502.

Various sets of point values for points 404 are shown in FIG. 5 to illustrate how an input point cloud dataset can include, for each of the plurality of points 404, a respective set of values corresponding to each attribute in a set of attributes 502 that includes at least first and second attributes (and in this example also includes third and fourth attributes). FIG. 5 also shows how these values can be arranged in attribute datasets 504 that facilitate scalable compression of point cloud data in accordance with principles that will be described in more detail below. While these respective sets of values are the only data explicitly represented in FIG. 5, it will be understood that, in certain implementations, an input point cloud dataset such as input point cloud dataset 500 may further include other data indicative of other features of an object or scene, or other information as may serve a particular implementation. For example, given that point cloud 402 represented by input point cloud dataset 500 is associated with a particular object of a set of objects at a scene (e.g., one of objects 312 at scene 310), the set of objects may be represented by a set of point clouds that includes point cloud 402. As such, input point cloud dataset 500 may include information (not explicitly shown) about 3D object 400 to help distinguish and prioritize this object from other objects 312 in the set of objects.

For instance, input point cloud dataset 500 may include at least one of: 1) segmentation data configured to differentiate point cloud 402 from other point clouds of the set of point clouds, or 2) priority data configured to indicate a priority relationship between 3D object 400 and one or more other objects 312 of the set of objects at scene 310. Segmentation data may indicate the object, out of several objects at a scene, to which a particular point cloud dataset belongs or corresponds. Priority data may then indicate a relative importance of certain objects over others so that higher-priority point cloud datasets may be processed first or compressed in different ways (e.g., with more or fewer levels of scalability than lower-priority point cloud datasets, etc.).

Figure 6:
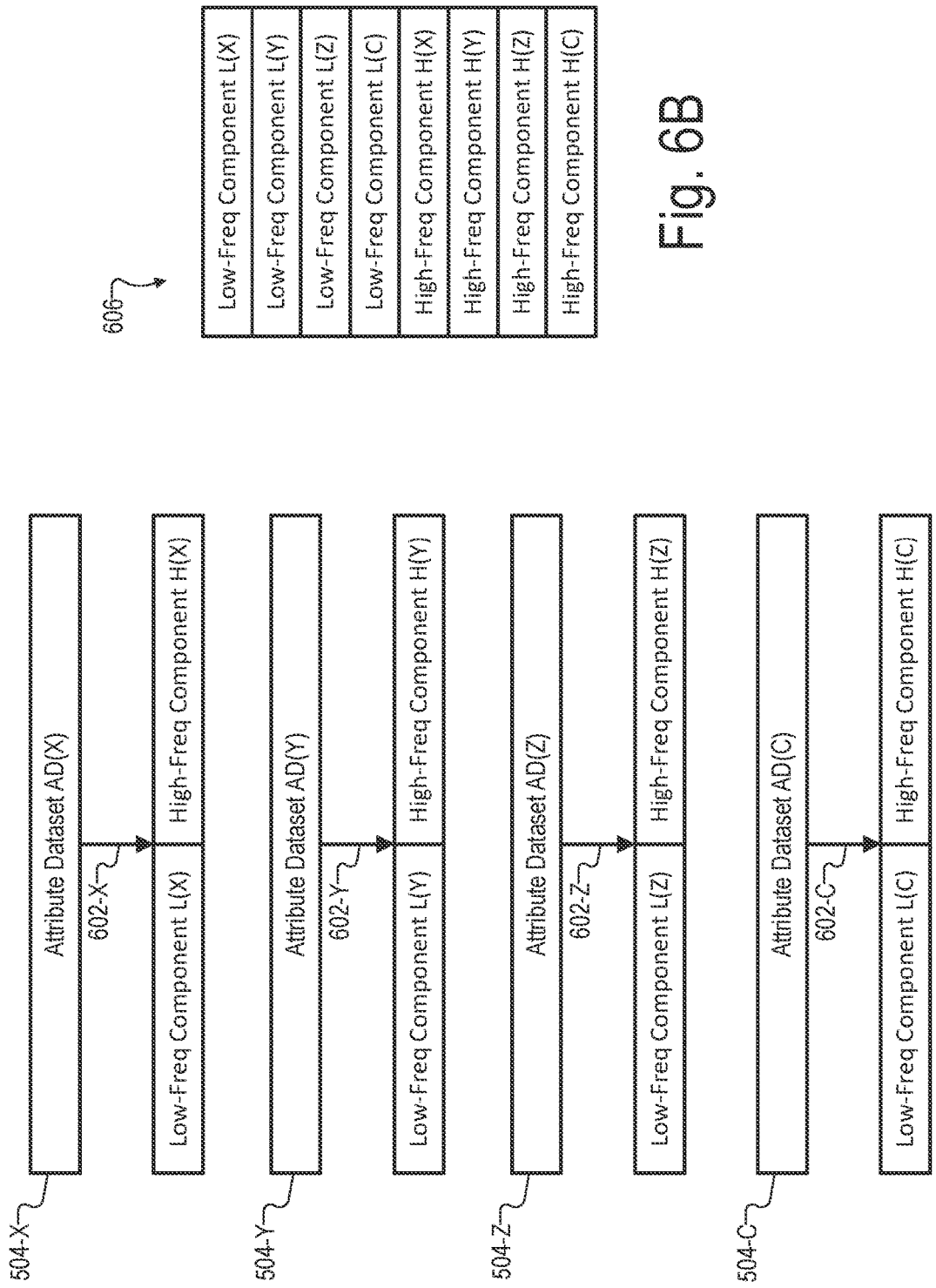
FIG. 6A shows an illustrative application of a transform algorithm to various attribute datasets identified from the point cloud dataset of FIG. 5 in accordance with principles described herein.
FIG. 6B shows an illustrative output point cloud dataset generated based on the application of the transform algorithm in FIG. 6A in accordance with principles described herein.

FIG. 6A shows an illustrative application of a transform algorithm to various attribute datasets 504 identified from point cloud dataset 500. Conventionally, transform algorithms have been employed to separate 2D images (composed of pixels) or 3D models (composed of voxels) into different components along different dimensions of the image or model. For example, when transforming a 2D image in this way, four components have been generated based on a filtering of high-frequency and low-frequency energy in both the horizontal (x-axis) direction and the vertical (y-axis) direction. Specifically, a Low/Low (LL) component representing low-frequency energy in both directions, a Low/High (LH) component and a High/Low (HL) component representing low-frequency energy in one direction and high-frequency energy in the other, and a High/High (HH) component representing high-frequency energy in both directions, have all been generated and tiled together in an output image. This has allowed a recipient of the image to display or use only the LL component to get a lower quality version of the image, or to optionally add the details represented by one or more of the other components (that include the higher-frequency energy) to render a higher quality version of the image. Similarly, 3D models have conventionally been filtered similarly into eight components that are packed together for storage or transmission using an octree structure.

In contrast to these conventional approaches, the example of FIG. 6A illustrates a sub-band approach that analyzes each attribute sub-band (e.g., each of attribute datasets 504) individually, rather than using the octree-based or other such compression approaches. One advantage of analyzing separate sub-bands in this way is that there is no need to select a privileged perspective from which 2D images or a 3D model are projected, such as may be needed for the techniques described above. Rather, as shown in FIG. 6A, a transform algorithm 602 is individually applied to each attribute dataset to filter a low-frequency component ("Low-Freq Component") from a high-frequency component ("High-Freq Component"). Specifically, attribute dataset 504-X is transformed (e.g.; filtered, separated, rearranged, etc.) by an application of the transform algorithm labeled transform algorithm 602-X, attribute dataset 504-Y is transformed by an application of the transform algorithm labeled transform algorithm 602-Y, attribute dataset 504-Z is transformed by an application of the transform algorithm labeled transform algorithm 602-Z, and attribute dataset 504-C is transformed by an application of the transform algorithm labeled transform algorithm 602-C.

As shown, the low- and high-frequency components resulting from each application of transform algorithm 602 are labeled with an "L" for Low-frequency or an "H" for High-frequency, as well as a parenthetical indicator "X", "Y", "Z", or "C" corresponding to which attribute dataset 504 the components derive from. For example, attribute dataset 504-X is shown to be transformed into a low-frequency component "L(X)" and a high-frequency component "H(X)", attribute dataset 504-Y is shown to be transformed into a low-frequency component "L(Y)" and a high-frequency component "H(Y)", and so forth. As will be further described, this notation format will be used and built on for additional examples below involving implementations with more than one level of filtering.

The transform algorithm 602 used to filter each of attribute datasets 504 to generate the respective low- and high-frequency components may be implemented by any suitable transform algorithm as may serve a particular implementation. For instance, the transform algorithm 602 applied to each of the attribute datasets 504 may be a wavelet transform algorithm implementing, for example, a fast wavelet transform (FWT), a discrete wavelet transform (DWT), a forward DWT, an inverse DWT, or another suitable wavelet transform. In various implementations, transform algorithm 602 may invoke a relatively simple filtering (e.g.; a 2-tap filter that may average neighboring pixels for the low-frequency component while determining the difference of neighboring pixels for the high-frequency component, etc.) or a more complex and advanced filtering (e.g., using more than two taps). As one example, a wavelet transform for a particular sub-band or attribute dataset with index i may be expressed by Equation 1:

$$W_\varphi[\text{attribute }(i, s, p)] = \frac{1}{\sqrt{M}} \sum_{attribute(i)} PC(\text{attribute }(i, s, p)) * \varphi(i) \quad \text{(Eq. 1)}$$

In Equation W represents the wavelet transform output, s represents a segmentation filter, p represents a priority filter, M represents the number of filter taps, and PC represents a point cloud (e.g., point cloud 402).

Once transform algorithm 602 has been applied to each attribute dataset 504 to generate the low- and high-frequency components for each attribute, an output point cloud dataset may be generated that prioritizes (e.g., leads with, etc.) the low-frequency components above the high-frequency components (which may follow later in the dataset).

To illustrate, FIG. 68 shows an illustrative output point cloud dataset 606 generated based on the application of transform algorithm 602 to each of attribute datasets 504 as described in relation to FIG. 6A. As shown, each of the low-frequency components (i.e., L(X), L(Y), L(Z), and L(C)) derived from input point cloud dataset 500 are prioritized in output point cloud dataset 606 by being put first in the dataset, above or before each of the high-frequency components (i.e., H(X), H(Y), H(Z), and H(C)). As will be described and illustrated in more detail below, this prioritization may result in scalability and flexibility benefits when a desired level of detail for the point cloud is stored, transmitted, or otherwise used.

The example illustrated by FIGS. 6A and 6B relates to a single level of filtering. That is, transform algorithm 602 is applied just once to each attribute dataset 504 to create a single low-frequency component and high-frequency component associated with each attribute. It will be understood however, that more complex examples need not be limited to a single level in this way. To the contrary, point cloud data can be filtered into an arbitrary number of levels to create an arbitrary amount of granularity and arbitrary degree of scalability and flexibility for the output point cloud dataset. For example, based on an application of transform algorithm 602 to a first low-frequency component (e.g., L(X)), system 100 may generate a first low/low-frequency component (e.g., referred to in the abbreviated notation as LL(X)) and a first low/high-frequency component (e.g., referred to in the abbreviated notation as LH(X)) of a first attribute dataset (e.g., attribute dataset 504-X in this example). Similarly, based on an application of transform algorithm 602 to a second low-frequency component (e.g., L(Y)), system 100 may generate a second low/low-frequency component (e.g., referred to as LL(Y)) and a second low/high-frequency component (e.g., referred to as LH(Y)) of a second attribute dataset (e.g., attribute dataset 504-Y in this example).

Other low-frequency attributes derived from other attribute datasets could similarly be transformed, then the generating of the output point cloud dataset may include prioritizing all of the low/high-frequency components (e.g., including both the first and second low/high-frequency components) above all of the high-frequency components (e.g., including both the first and second high-frequency components), as well as prioritizing all of the low/low-frequency components (e.g., including both the first and second low/low-frequency components) above all the low/high-frequency components (e.g., including both the first and second low/high-frequency components). Any desired number of additional levels could similarly be processed by continuing to apply the transform algorithm to the component including all the low frequency information (e.g., the low/low-frequency components for each attribute dataset, then the low/low/low-frequency components for each attribute dataset, and so forth).

Figure 7:
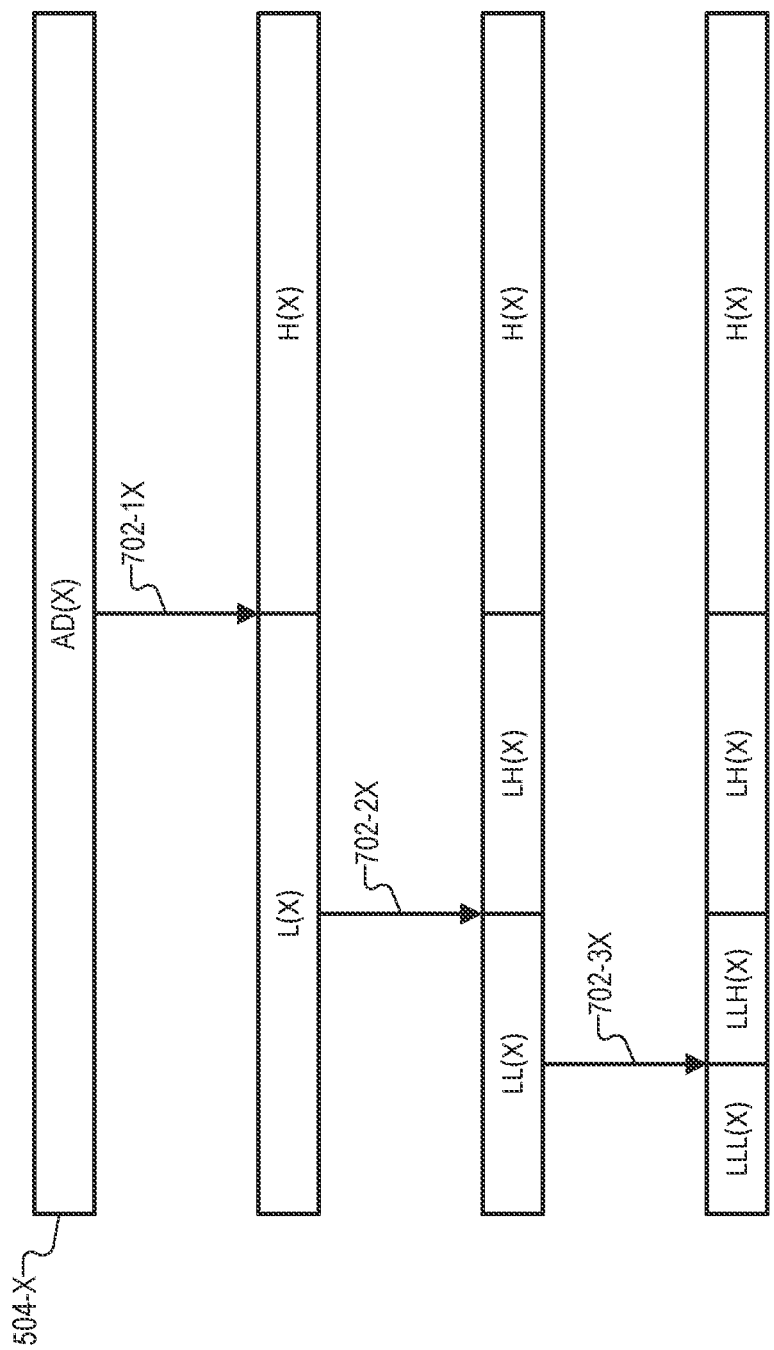
FIG. 7 shows an illustrative multi-level application of a transform algorithm to a particular attribute dataset identified from the point cloud dataset of FIG. 5 in accordance with principles described herein.

To illustrate how multiple levels of filtering may be performed, FIG. 7 shows an illustrative multi-level application of a transform algorithm to a particular attribute dataset 504 identified from point cloud dataset 500. Specifically, for purposes of illustration, attribute dataset 504-X (associated with the x-axis attribute as described above and labeled "AD(X)" in this example) is used in FIG. 7. However, it will be understood that the same principles applied to attribute dataset 504-X may also be applied to the remainder of the attribute datasets 504 to generate similar multi-level components for each attribute (the results of multi-level application of a transform algorithm to each of attribute datasets 504 will be illustrated in FIG. 8A).

As shown, a first application of a transform algorithm 702 to attribute dataset 504-X is labeled as transform algorithm 702-1X (the "1X" signifying that this is a first level transformation related to the x-axis attribute). Similar to the application of transform algorithm 602-X described above, FIG. 7 shows that transform algorithm 702-1X results in a low-frequency component labeled L(X) and a high-frequency component labeled H(X). A second application of transform algorithm 702 is shown to be labeled as transform algorithm 702-2X and to be performed on the low-frequency component L(X) (it is noted that the high-frequency component H(X) is not further transformed in this example and thus is carried through to each of the additional transform levels unchanged). As shown, the application of transform algorithm 702-2X to the low-frequency component L(X)

results in a low/low-frequency component labeled LL(X) and a low/high-frequency component labeled LH(X).

Continuing on to a third level of transformation, a third application of transform algorithm 702 is shown to be labeled as transform algorithm 702-3X and to be performed on the low/low-frequency component LL(X) (it is noted that the low/high-frequency component LH(X) is not further transformed in this example and thus is carried through to the additional transform level unchanged). As shown, the application of transform algorithm 702-3X to the low/low-frequency component LL(X) results in a low/low/low-frequency component labeled LLL(X) and a low/low/high-frequency component labeled LLH(X). Accordingly, at the bottom row on FIG. 7, a multi-level representation of attribute dataset 504-X is shown to be made up of components from three levels of transformations: the low/low/low-frequency component LLL(X), the low/low/high-frequency component LLH(X), the low/high-frequency component LH(X), and the high-frequency component H(X).

As mentioned above, FIG. 8A shows illustrative multi-level representations of each of attribute datasets 504 identified from point cloud dataset 500. Specifically, the same components shown in FIG. 7 (i.e., LLL(X), LLH(X), LH(X), and H(X)) are shown for attribute dataset 504-X (e.g., for the x-axis attribute), as well as analogous components for each of attribute datasets 504-Y (i.e., LLL(Y), LLH(Y), LH(Y), and H(Y)); 504-Z (i.e., LLL(Z), LLH(Z), LH(Z), and H(Z)); and 504-C(i.e., LLL(C), LLH(C), LH(C), and H(C)). Once the transform algorithm has been applied for each level desired (three levels in this example, though it will be understood that any suitable number of levels may be employed as may serve a particular implementation), an output point cloud dataset may be generated that prioritizes (e.g., leads with, etc.) low-frequency components for each attribute above the higher-frequency components of the attribute.

Figures 8A, 8B:
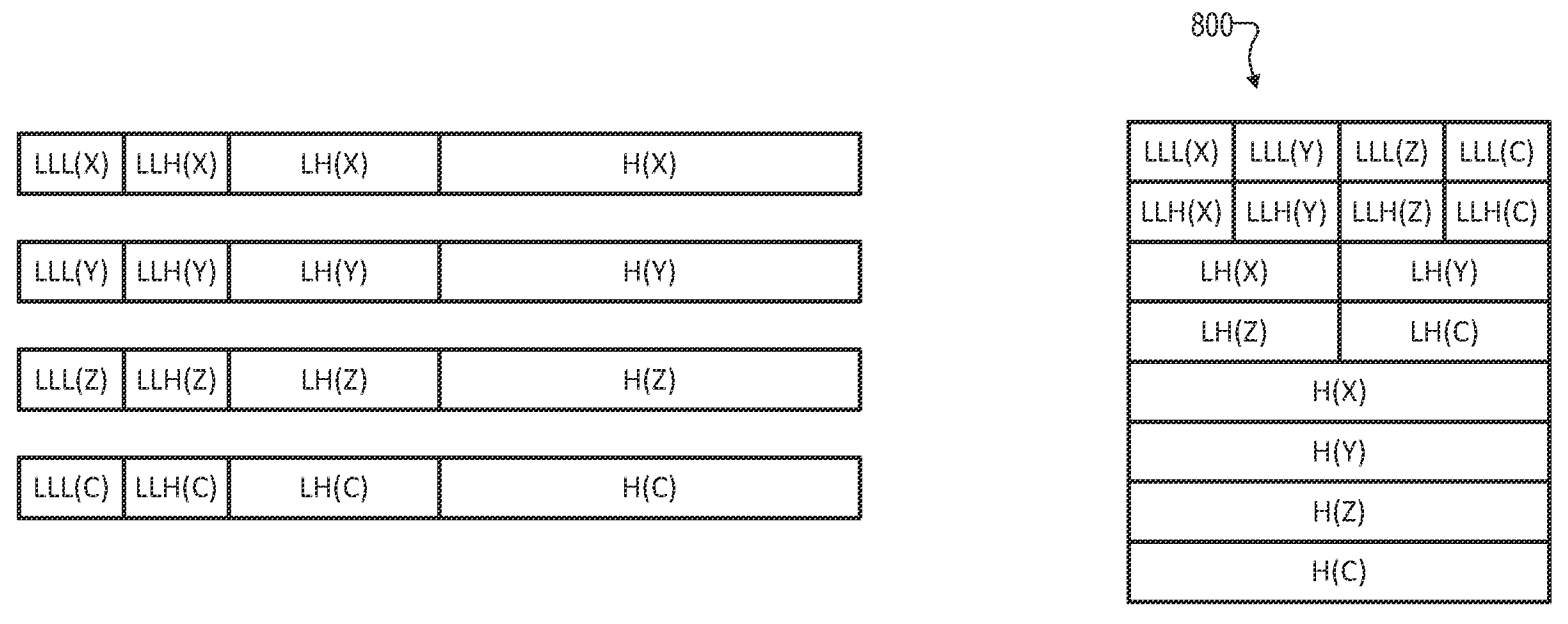

To illustrate, FIG. 8B shows an illustrative output point cloud dataset 800 generated based on the multi-level attribute datasets described in relation to FIG. 8A. As shown, each of the low/low/low-frequency components (i.e., LLL (X), LLL(Y), LLL(Z), and LLL(C)) derived from input point cloud dataset 500 are given highest priority in output point cloud dataset 800 by being put first in the dataset, each of the low/low/high-frequency components (i.e., LLH(X), LLH(Y), LLH(Z), and LLH(C)) are given next highest priority in output point cloud dataset 800 by being put second in the dataset, each of the low/high-frequency components (i.e., LH(X), LH(Y), LH(Z), and LH(C)) are given next highest priority in output point cloud dataset 800 by being put third in the dataset, and, finally, each of the high-frequency components (i.e., H(X), H(Y), H(Z), and H(C)) are given lowest priority in output point cloud dataset 800 by being put last in the dataset.

As has been mentioned, after generating an output point cloud dataset such as output point cloud dataset 800, system 100 may provide the output point cloud dataset to a point cloud processing system configured to store, transmit, analyze, or otherwise use the output point cloud dataset. For example, system 100 may provide the output point cloud dataset to a system such as point cloud processing system 306. By structuring an output point cloud dataset in the compressed and/or prioritized manner described above (and illustrated with the example of output point cloud datasets 606 and 800), system 100 may facilitate scalable and flexible usage of the point cloud data stored in the output point cloud dataset. For example, certain point cloud processing systems that require or can support only a basic amount of detail for the point cloud may be provided only one or more of the prioritized layers of the output point cloud dataset (e.g.; the layer including the low/low/low-frequency components, the layer including the low/low/high-frequency components, etc.), while other point cloud processing systems that require or can support a greater amount of detail for the point cloud may further be provided some or all of the additional, lower-priority layers (e.g., the layer including the low/high-frequency components, the layer including the high-frequency components, etc.).

Based on the capabilities and needs of a given point cloud processing system, only a certain portion of the output point cloud dataset may actually be put to use, even while a same output point cloud dataset may serve all types of devices. For example, for a point cloud processing system that is not configured to handle the entirety of a particular output point cloud dataset, one portion (e.g., a higher-priority portion) of the output point cloud dataset may be provided to or used (e.g., stored, transmitted, analyzed, etc.) by the point cloud processing system, while another portion (e.g.; a lower-priority portion) of the output point cloud dataset may not be provided at all, or may be provided but not used. That is, the point cloud processing system may store, transmit, analyze, or otherwise use a first portion of the output point cloud dataset, while abstaining from storing, transmitting, analyzing, or otherwise using a second portion of the output point cloud dataset that is less prioritized than the first portion.

Figure 9:
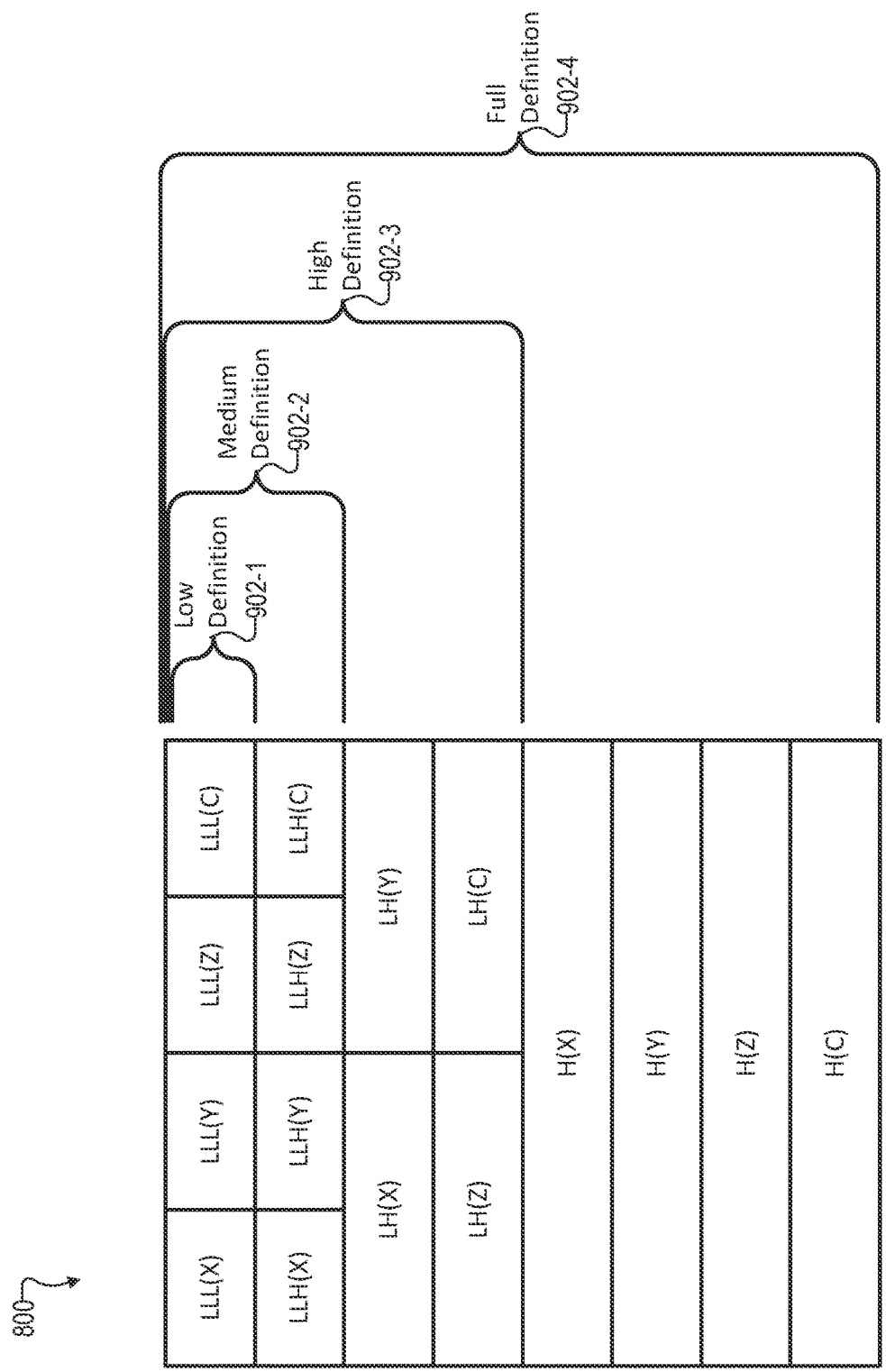
FIG. 9 shows illustrative ways that the output point cloud dataset of FIG. 8B can be used to provide compressed point cloud data to a point cloud processing system in accordance with principles described herein.

To illustrate, FIG. 9 shows illustrative ways that output point cloud dataset 800 can be used to provide compressed point cloud data to different types of point cloud processing systems. As shown, the first layer including the low/low/low-frequency components for each attribute (LLL(X), LIL (Y), LLL(Z), and LLL(C)) may be provided or used as a low-definition data structure 902-1 (e.g., a low-definition data file, data stream, etc.). The second layer including the low/low/high-frequency components for each attribute (LLH(X), LLH(Y), LLH(Z), and LLH(C)) may be added to the first layer to create a medium-definition data structure 902-2. The third layer including the low/high-frequency components for each attribute (LH(X), LH(Y), LH(Z), and LH(C)) may be added to the first and second layers to create a high-definition data structure 902-3. Finally, the fourth and final layer including the high-frequency components for each attribute (H(X), H(Y), H(Z), and H(C)) may be added to the first, second, and third layers to create a full-definition data structure 902-4. The different data structures 902-1 through 902-4 may be provided to different point cloud processing systems with different capabilities or under different circumstances as may serve a particular implementation.

Moreover, along with this advantage of the same output point cloud dataset being made available in different forms for devices of differing capabilities and needs (e.g., phones with small screens, laptop with larger screens, televisions with an even larger screens, etc.), other advantages may also arise from the scalability and flexibility provided by output point cloud dataset 800 and the straightforward way that its layers can be used. As one example, even for devices that may be configured to handle more data, communicative bottlenecks may present challenges in being able to provide the desired level of detail to the point cloud processing system within desired time constraints. In these examples, it may be beneficial for the point cloud processing system to receive the most important detail right away (in the first prioritized layer) and to receive less important details (in layers with lower priorities) at a later time as the communication restrictions may permit. For example, if a point cloud is to be presented, a good basic outline of the entire point cloud may be presented based only on the first layer of point cloud data (the low/low/low-frequency components) while data representing additional details to fill in the outline (stored in the lower-priority layers) is making its way through a congested communication network or other delayed communication path.

The examples described above have generally focused on a single snapshot (i.e., at a single moment in time) of a composite 3D point cloud having X, Y, Z, and Color attributes for each point. As has been mentioned, however, principles described herein may also be used to compress and prioritize temporal point cloud data (e.g., point cloud data from different frames captured at different times in a time sequence). Specifically, for instance, an input point cloud dataset may include a plurality of point cloud frames each representative of a point cloud at a different time in a sequence of times associated with the plurality of point cloud frames. Rather than (or in addition to) a set of attributes including attributes like positional coordinates and color data, the set of attributes in this example may include attributes corresponding to different point cloud frames in the plurality of point cloud frames. For instance, a first attribute may correspond to the point cloud as represented in a first point cloud frame of the plurality of point cloud frames, a second attribute may correspond to the point cloud as represented in a second point cloud frame of the plurality of point cloud frames, and so forth. By interleaving the frames associated with different attributes in the set of attributes, scalable compression of temporal point cloud data may be achieved as an alternative or in addition to scalable compression of the positional and non-positional point cloud data (e.g., color, etc.) that has been described.

Figures 10A, 10B, 10C:
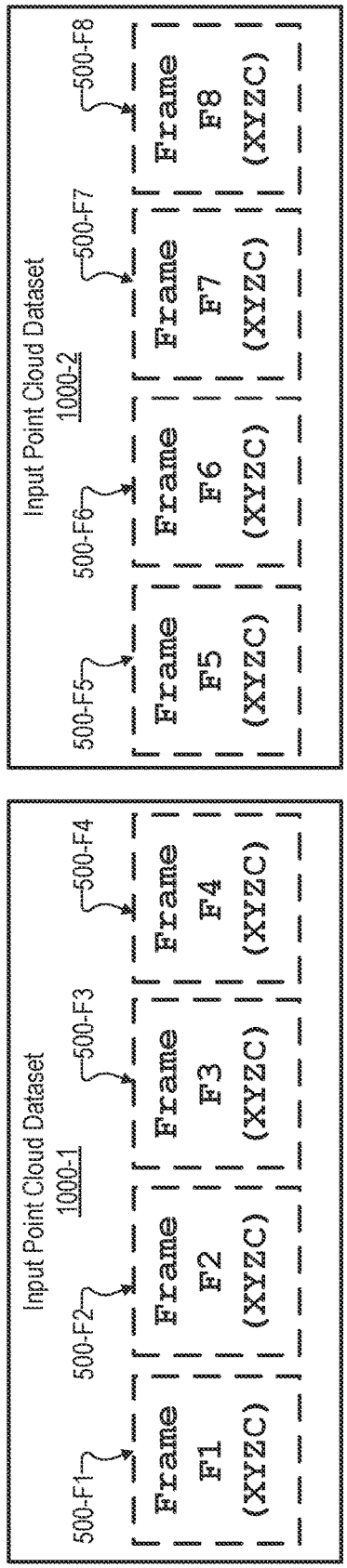
FIGS. 10A-10C show illustrative aspects of temporal compression of point cloud data in accordance with principles described herein.

To illustrate, FIGS. 10A-10C show illustrative aspects of temporal compression of point cloud data in accordance with principles described herein, Specifically, as shown, a plurality of frames labeled as frames 500-F1 through 500-F8 is shown in FIG. 10A to represent time-varying versions of input point cloud dataset 500 implementing frames F1-F8 associated with slightly different times in a time sequence (e.g., a time sequence providing 30 fps or another suitable frame rate). Each of these frames is labeled in FIG. 10A and will be understood to include the same types of X, Y, Z, and Color attribute data described above in relation to FIG. 5. FIG. 10A shows how these frames (as well as other frames in the sequence not explicitly shown in FIG. 10A) may be grouped together into groups of four frames each for this example. The first group of four frames (i.e., frames for input point cloud datasets 500-F1 through 500-F4) is shown to be considered an aggregate input point cloud dataset 1000-1 for this implementation. The second group of four frames (i.e., frames for input point cloud datasets 500-F5 through 500-F8) is labeled as an aggregate input point cloud dataset 1000-2 in like manner, and it will be understood that similar groupings could be further aggregated in this way as the frame sequence continues on after the eighth frame.

The aggregate input point cloud datasets 1000 may be compressed in a similar way as has been described herein by processing the frames included therein as attributes of the aggregate input point cloud datasets. For example, FIG. 10B is shown to be similar to FIG. 8A, except that the components in this example relate to the different frames of input point cloud dataset 1000-1 (i.e., F1, F2, F3, and F4) rather than the positional and color attributes (X, Y, Z, and C) of FIG. 8A. FIG. 10C then shows an output point cloud dataset 1002 prioritized in a similar way as output point cloud dataset 800, but using the components of FIG. 10B. As such, a receiver of output point cloud dataset 1002 may first receive basic, high-priority details about each of frames F1-F4, then receive more nuanced, lower-priority details about each frame in a similar way as described above in relation to FIG. 8B.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media, Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
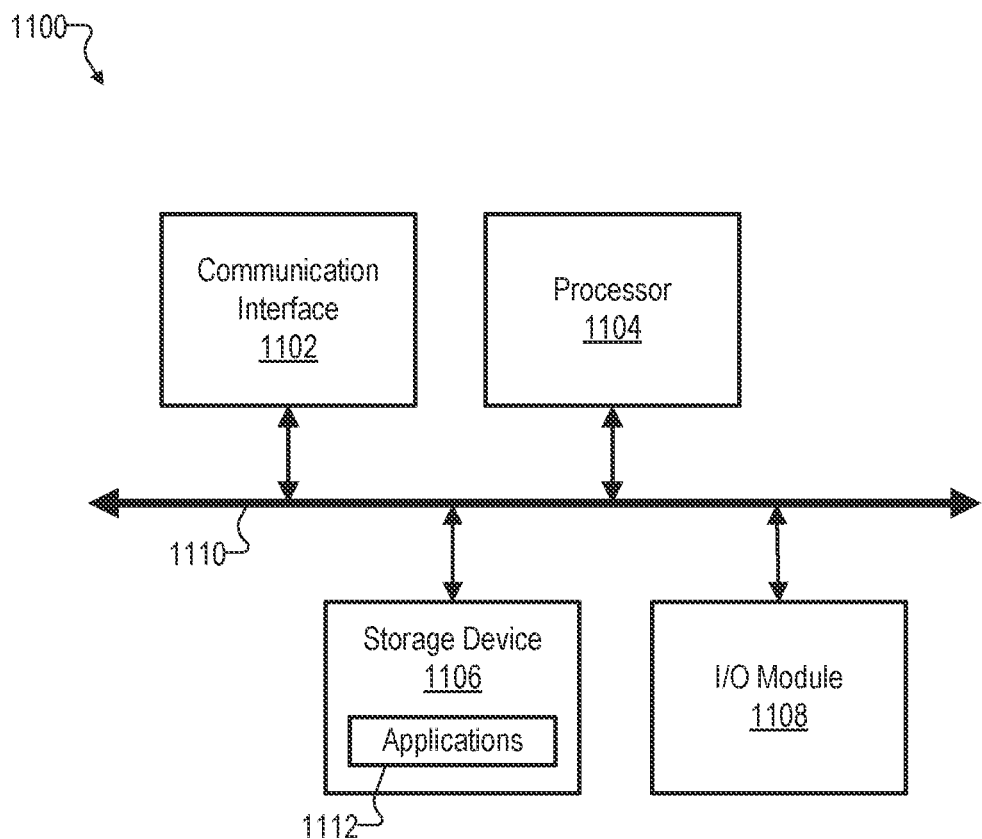
FIG. 11 shows an illustrative computing device that may implement point cloud compression systems and/or other computing systems and devices described herein in accordance with principles described herein.

FIG. 11 shows an illustrative computing device 1100 that may implement point cloud compression systems and/or other computing systems and devices described herein in accordance with principles described herein. For example, computing device 1100 may include or implement (or partially implement) a point cloud compression system such as system 100, components included therein, or other devices or systems associated therewith and/or described herein (e.g., point cloud provider system 302, point cloud processing system 306, certain elements of network 304 or capture devices 308, etc.).

As shown in FIG. 11, computing device 1100 may include a communication interface 1102, a processor 1104, a storage device 1106, and an input/output (I/O) module 1108 communicatively connected via a communication infrastructure 1110. While an illustrative computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein.

Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with processor 104 of system 100. Likewise, memory 102 of system 100 may be implemented by or within storage device 1106.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
    accessing, by a point cloud compression system, an input point cloud dataset comprising a plurality of data points and representative of a point cloud comprising a plurality of points, each data point of the plurality of data points corresponding to a single point of the plurality of points and including a respective set of values corresponding to each attribute in a set of attributes that includes a first attribute and a second attribute for each point of the plurality of points;
    identifying, by the point cloud compression system, a first attribute dataset and a second attribute dataset within the input point cloud dataset, each data point of the first attribute dataset corresponding to the first attribute from each of the respective sets of values and to a single point of the plurality of points, and each data point of the second attribute dataset corresponding to the second attribute from each of the respective sets of values and to a single point of the plurality of points;
    generating, by the point cloud compression system and based on an application of a transform algorithm to the first attribute dataset, a first low-frequency component and a first high-frequency component of the first attribute dataset;
    generating, by the point cloud compression system and based on an application of the transform algorithm to the second attribute dataset, a second low-frequency component and a second high-frequency component of the second attribute dataset; and
    generating, by the point cloud compression system, an output point cloud dataset that prioritizes both the first and second low-frequency components above both the first and second high-frequency components.

2. The method of claim 1, wherein the transform algorithm applied to the first and second attribute datasets is a wavelet transform algorithm.

3. The method of claim 1, further comprising:
    generating, by the point cloud compression system and based on an application of the transform algorithm to the first low-frequency component, a first low/low-frequency component and a first low/high-frequency component of the first attribute dataset; and
    generating, by the point cloud compression system and based on an application of the transform algorithm to the second low-frequency component, a second low/low-frequency component and a second low/high-frequency component of the second attribute dataset;
    wherein the generating of the output point cloud dataset includes:
        prioritizing both the first and second low/high-frequency components above both the first and second high-frequency components, and
        prioritizing both the first and second low/low-frequency components above both the first and second low/high-frequency components.

4. The method of claim 1, wherein:
    the point cloud is a two-dimensional (2D) point cloud;
    each of the plurality of points is a 2D point defined with respect to a 2D coordinate system having an x-axis and a y-axis; and the set of attributes includes attributes corresponding to
the 2D coordinate system:
the first attribute corresponding to the x-axis, and
the second attribute corresponding to the y-axis.

5. The method of claim 1, wherein:
the point cloud is a three-dimensional (3D) point cloud;
each of the plurality of points is a 3D point defined with respect to a 3D coordinate system having an x-axis, a y-axis, and a z-axis; and
the set of attributes includes attributes corresponding to the 3D coordinate system:
the first attribute corresponding to the x-axis,
the second attribute corresponding to the y-axis, and
a third attribute corresponding to the z-axis.

6. The method of claim 1, wherein:
the point cloud is a composite three-dimensional (3D) point cloud;
each of the plurality of points is a composite 3D point defined with respect to a 3D coordinate system having an x-axis, a y-axis, and a z-axis and with respect to a composite attribute indicative of a non-positional feature of the composite 3D point; and
the set of attributes includes attributes corresponding to the 3D coordinate system and the composite attribute:
the first attribute corresponding to the x-axis,
the second attribute corresponding to the y-axis,
a third attribute corresponding to the z-axis, and
a fourth attribute corresponding to the non-positional feature.

7. The method of claim 1, wherein:
the point cloud is associated with a particular object of a set of objects at a scene;
the set of objects is represented by a set of point clouds that includes the point cloud; and
the input point cloud dataset includes at least one of:
segmentation data configured to differentiate the point cloud from other point clouds of the set of point clouds, or
priority data configured to indicate a priority relationship between the particular object and one or more other objects of the set of objects at the scene.

8. The method of claim 1, wherein:
the input point cloud dataset includes a plurality of point cloud frames each representative of the point cloud at a different time in a sequence of times associated with the plurality of point cloud frames; and
the set of attributes includes attributes corresponding to different point cloud frames in the plurality of point cloud frames, the first attribute corresponding to the point cloud as represented in a first point cloud frame of the plurality of point cloud frames and the second attribute corresponding to the point cloud as represented in a second point cloud frame of the plurality of point cloud frames.

9. The method of claim 1, further comprising providing, by the point cloud compression system, the output point cloud dataset to a point cloud processing system configured to store, transmit, or analyze the output point cloud dataset.

10. The method of claim 9, wherein the point cloud processing system stores, transmits, or analyzes a first portion of the output point cloud dataset while abstaining from storing, transmitting, or analyzing a second portion of the output point cloud dataset that is less prioritized than the first portion.

11. A system comprising:
a memory storing instructions; and
a processor communicatively coupled to the memory and configured to execute the instructions to:
access an input point cloud dataset comprising a plurality of data points and representative of a point cloud comprising a plurality of points, each data point of the plurality of data points corresponding to a single point of the plurality of points and including a respective set of values corresponding to each attribute in a set of attributes that includes a first attribute and a second attribute for each point of the plurality of points;
identify a first attribute dataset and a second attribute dataset within the input point cloud dataset, each data point of the first attribute dataset corresponding to the first attribute from each of the respective sets of values and to a single point of the plurality of points, and each data point of the second attribute dataset corresponding to the second attribute from each of the respective sets of values and to a single point of the plurality of points;
generate, based on an application of a transform algorithm to the first attribute dataset, a first low-frequency component and a first high-frequency component of the first attribute dataset;
generate, based on an application of the transform algorithm to the second attribute dataset, a second low-frequency component and a second high-frequency component of the second attribute dataset; and
generate an output point cloud dataset that prioritizes both the first and second low-frequency components above both the first and second high-frequency components.

12. The system of claim 11, wherein the transform algorithm applied to the first and second attribute datasets is a wavelet transform algorithm.

13. The system of claim 11, wherein:
the processor is further configured to execute the instructions to:
generate, based on an application of the transform algorithm to the first low-frequency component, a first low/low-frequency component and a first low/high-frequency component of the first attribute dataset, and
generating, based on an application of the transform algorithm to the second low-frequency component, a second low/low-frequency component and a second low/high-frequency component of the second attribute dataset; and
the generating of the output point cloud dataset includes:
prioritizing both the first and second low/high-frequency components above both the first and second high-frequency components, and
prioritizing both the first and second low/low-frequency components above both the first and second low/high-frequency components.

14. The system of claim 11, wherein:
the point cloud is a three-dimensional (3D) point cloud;
each of the plurality of points is a 3D point defined with respect to a 3D coordinate system having an x-axis, a y-axis, and a z-axis; and
the set of attributes includes attributes corresponding to the 3D coordinate system:
the first attribute corresponding to the x-axis,
the second attribute corresponding to the y-axis, and a third attribute corresponding to the z-axis.

15. The system of claim 11, wherein:
the point cloud is a composite three-dimensional (3D) point cloud;
each of the plurality of points is a composite 3D point defined with respect to a 3D coordinate system having an x-axis, a y-axis, and a z-axis, and defined with respect to a composite attribute indicative of a non-positional feature of the composite 3D point; and
the set of attributes includes attributes corresponding to the 3D coordinate system and the composite attribute:
the first attribute corresponding to the x-axis,
the second attribute corresponding to the y-axis,
a third attribute corresponding to the z-axis, and
a fourth attribute corresponding to the non-positional feature.

16. The system of claim 11, wherein:
the point cloud is associated with a particular object of a set of objects at a scene;
the set of objects is represented by a set of point clouds that includes the point cloud; and
the input point cloud dataset includes at least one of:
segmentation data configured to differentiate the point cloud from other point clouds of the set of point clouds, or
priority data configured to indicate a priority relationship between the particular object and one or more other objects of the set of objects at the scene.

17. The system of claim 11, wherein:
the input point cloud dataset includes a plurality of point cloud frames each representative of the point cloud at a different time in a sequence of times associated with the plurality of point cloud frames; and
the set of attributes includes attributes corresponding to different point cloud frames in the plurality of point cloud frames, the first attribute corresponding to the point cloud as represented in a first point cloud frame of the plurality of point cloud frames and the second attribute corresponding to the point cloud as represented in a second point cloud frame of the plurality of point cloud frames.

18. The system of claim 11, wherein the processor is further configured to execute the instructions to provide the output point cloud dataset to a point cloud processing system configured to store, transmit, or analyze the output point cloud dataset.

19. The system of claim 18, wherein the point cloud processing system stores, transmits, or analyzes a first portion of the output point cloud dataset while abstaining from storing, transmitting, or analyzing a second portion of the output point cloud dataset that is less prioritized than the first portion.

20. A non-transitory computer-readable medium storing instructions that, when executed, direct a processor of a computing device to:
access an input point cloud dataset comprising a plurality of data points and representative of a point cloud comprising a plurality of points, each data point of the plurality of data points corresponding to a single point of the plurality of points and including a respective set of values corresponding to each attribute in a set of attributes that includes a first attribute and a second attribute for each point of the plurality of points
identify a first attribute dataset and a second attribute dataset within the input point cloud dataset, each data point of the first attribute dataset corresponding to the first attribute from each of the respective sets of values and to a single point of the plurality of points, and each data point of the second attribute dataset corresponding to the second attribute from each of the respective sets of values and to a single point of the plurality of points;
generate, based on an application of a transform algorithm to the first attribute dataset, a first low-frequency component and a first high-frequency component of the first attribute dataset;
generate, based on an application of the transform algorithm to the second attribute dataset, a second low-frequency component and a second high-frequency component of the second attribute dataset; and
generate an output point cloud dataset that prioritizes both the first and second low-frequency components above both the first and second high-frequency components.

* * * * *